United States Patent
Takeda et al.

(10) Patent No.: US 9,268,685 B2
(45) Date of Patent: Feb. 23, 2016

(54) MEMORY SYSTEM AND CONSTRUCTING METHOD OF VIRTUAL BLOCK

(71) Applicant: KABUSHIKI KAISHA TOSHIBA, Minato-ku (JP)

(72) Inventors: Naomi Takeda, Kanagawa (JP); Hiroshi Yao, Kanagawa (JP); Arata Miyamoto, Tokyo (JP); Yu Nakanishi, Kanagawa (JP); Daisuke Iwai, Kanagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 287 days.

(21) Appl. No.: 13/953,065

(22) Filed: Jul. 29, 2013

(65) Prior Publication Data

US 2014/0289453 A1 Sep. 25, 2014

Related U.S. Application Data

(60) Provisional application No. 61/804,495, filed on Mar. 22, 2013.

(51) Int. Cl.
*G06F 12/02* (2006.01)

(52) U.S. Cl.
CPC .... *G06F 12/0246* (2013.01); *G06F 2212/7208* (2013.01)

(58) Field of Classification Search
CPC .............. G06F 12/0246; G06F 3/0679; G06F 2212/2022
USPC .................................................. 711/103, 170
See application file for complete search history.

(56) References Cited

U.S. PATENT DOCUMENTS

| 8,214,579 B2 * | 7/2012 | Mitsunaga et al. ........... 711/103 |
| 2010/0287332 A1 | 11/2010 | Koshiyama et al. |

FOREIGN PATENT DOCUMENTS

| JP | 2003-122630 | 4/2003 |
| JP | 2009-245163 | 10/2009 |
| JP | 2010-262507 | 11/2010 |

* cited by examiner

*Primary Examiner* — Jasmine Song
(74) *Attorney, Agent, or Firm* — Oblon, McClelland, Maier & Neustadt, L.L.P.

(57) ABSTRACT

According to one embodiment, a virtual block is constructed according to configuration conditions that, when a plurality of physical blocks included in the virtual block are selected, the sum of the number of physical block pairs and the number of single blocks allocated from the same memory chip to one virtual block is less than or equal to a first value.

19 Claims, 16 Drawing Sheets

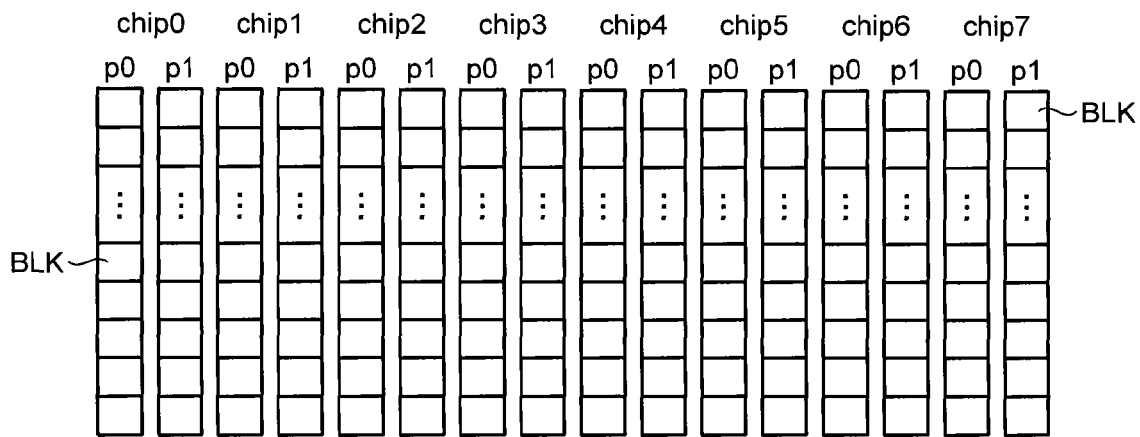

FIG.4

VIRTUAL BLOCK MANAGEMENT TABLE 22

| VIRTUAL BLOCK NUMBER | BLOCK CONFIGURATION INFORMATION (PHYSICAL BLOCK NUMBER) | USED/UNUSED |
|---|---|---|
|  |  |  |
|  |  |  |
|  |  |  |
| ⋮ | ⋮ |  |

FIG.5

BAD BLOCK TABLE 23

| PHYSICAL BLOCK NUMBER |
|---|
|  |
|  |
| ⋮ |

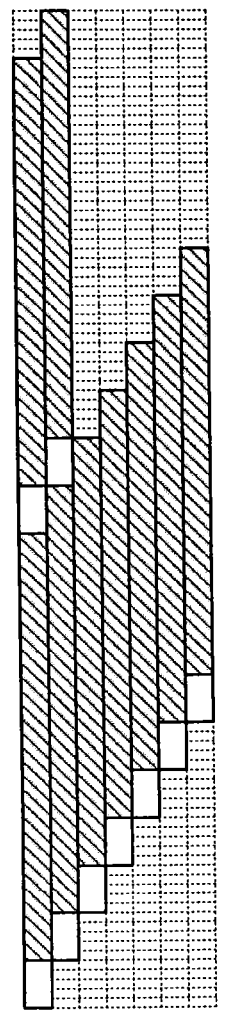
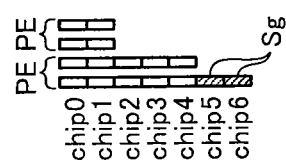
FIG.9

MEMORY SYSTEM AND CONSTRUCTING METHOD OF VIRTUAL BLOCK

CROSS-REFERENCE TO RELATED APPLICATIONS

This application is based upon and claims the benefit of priority from U.S. Provisional Patent Application No. 61/804,495, filed on Mar. 22, 2013; the entire contents of which are incorporated herein by reference.

FIELD

Embodiments described herein relate generally to a memory system including a non-volatile semiconductor memory and a method of constructing a virtual block.

BACKGROUND

Physical blocks which are arranged over a plurality of memory chips are combined to configure a virtual block, thereby achieving read and write accesses to a non-volatile memory, in order to improve the performance using the parallelism of processes or perform the error correction protection of a memory in which an error is likely to occur, when data is written to the non-volatile memory. When the number of normal (good) physical blocks in all chips is sufficient, the physical blocks can be combined such that the number of parallel processes is the maximum in all virtual blocks. However, with the miniaturization of the non-volatile memory, the number of defective blocks (hereinafter, referred to as bad blocks) which are not normally operated in the non-volatile memory has increased due to various causes.

In addition, in some cases, the physical block which has not been a bad block at the initial start of the system changes to the bad block when it is used for a long time. For example, a wear leveling method has been used which controls the number of erasing/writing processes for each block to perform wear leveling for each block. However, it is difficult to completely control the generation of the bad block due to, for example, a difference in durability which depends on finish in a manufacturing process or the position on the chip.

If as many virtual blocks as possible are to be configured by using physical blocks other than bad blocks, a virtual block might be configured by selecting a plurality of physical blocks from the same plane of the same memory chip in some cases. The physical blocks belonging to the same plane of the same memory chip cannot be accessed from a controller at the same time. Therefore, depending on the method of configuring a virtual block, the time required for access varies between virtual blocks.

BRIEF DESCRIPTION OF THE DRAWINGS

FIG. 2 is a diagram illustrating a configuration example of a non-volatile semiconductor memory including a plurality of memory chips and a plurality of planes;
FIG. 3 is a diagram illustrating an address translation table;
FIG. 4 is a diagram illustrating a virtual block management table;
FIG. 5 is a diagram illustrating a bad block table;
FIG. 9 is a timing chart when a virtual block constructed in this embodiment is written.

DETAILED DESCRIPTION

According to an embodiment, a memory system includes a non-volatile semiconductor memory and a controller. The non-volatile semiconductor memory includes a plurality of memory chips which can be operated in parallel. Each of the memory chips is divided into a plurality of planes which can be operated in parallel and each of the planes includes a plurality of physical blocks as a unit of data erasing. The controller controls the non-volatile semiconductor memory. The controller includes a virtual block management unit and a virtual block construction unit. In the virtual block management unit, the correspondence between a virtual block and a plurality of physical blocks for configuring the virtual block is managed. The virtual block construction unit constructs the virtual block according to configuration conditions that the sum of the number of physical block pairs and the number of single blocks allocated from the same memory chip to one virtual block is less than or equal to a first value.

Hereinafter, a memory system and a virtual block construction method according to embodiments of the invention will be described in detail with reference to the accompanying drawings. The invention is not limited by the embodiments.

First Embodiment

Figure 1:
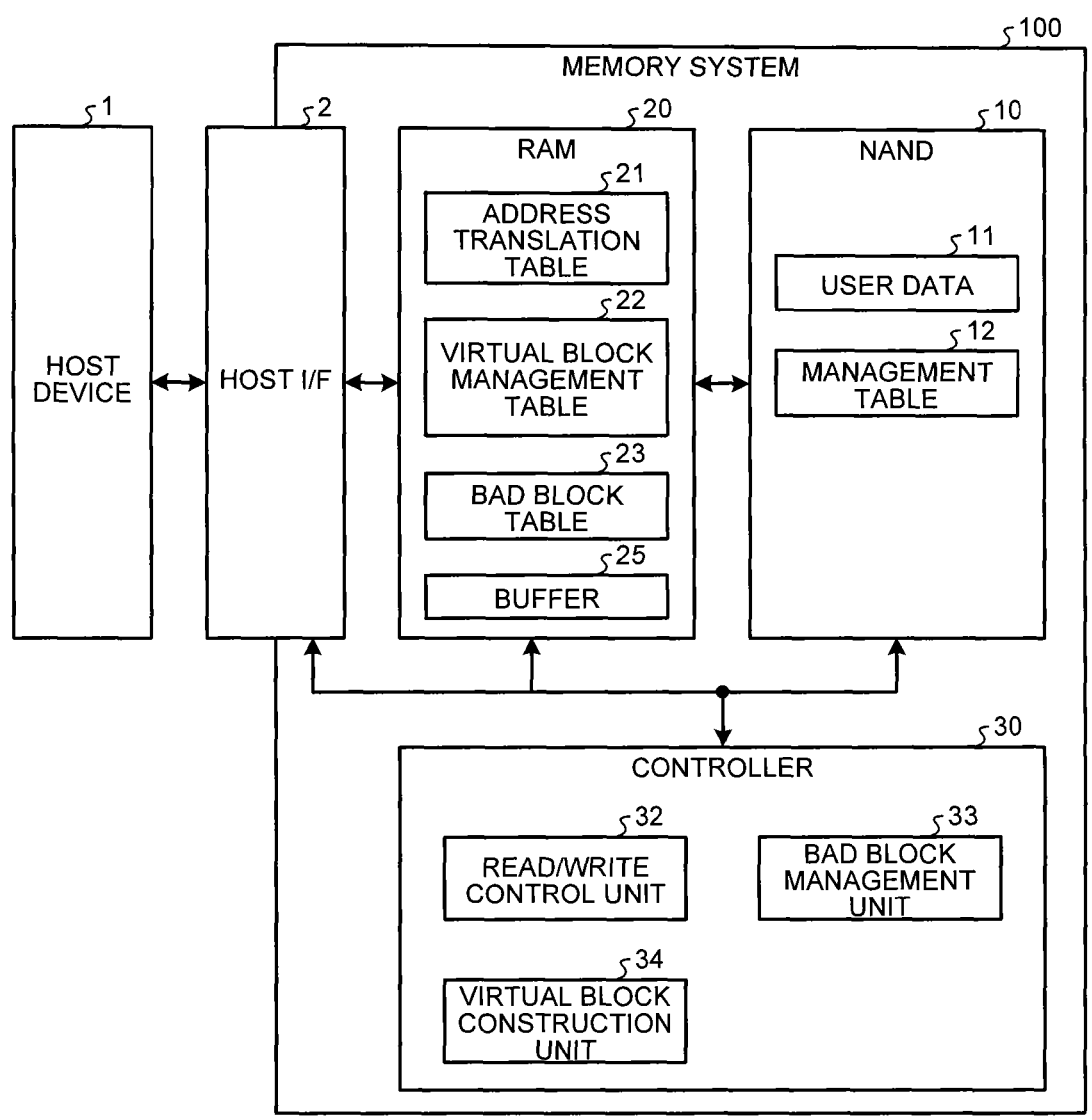
FIG. 1 is a functional block diagram illustrating the internal configuration of a memory system.

FIG. 1 is a block diagram illustrating a configuration example of a memory system 100. The memory system 100 is connected to a host device 1, such as a personal computer or a CPU, through a host interface 2 and functions as an external storage device of the host device 1. The host 1 is, for example, a CPU of a personal computer or a CPU of an imaging apparatus, such as a still camera or a video camera. The memory system 100 includes the host interface 2, a NAND flash memory (hereinafter, abbreviated to a NAND) 10, which is a non-volatile semiconductor memory, a RAM 20 which is a semiconductor memory with a higher access speed than the NAND 10, and a controller 30.

The NAND 10 stores user data 11 which is designated by the host device 1 and backs up management information managed by the RAM 20 as a management table 12. The NAND 10 has a memory cell array in which a plurality of memory cells are arranged in a matrix and each memory cell can store multiple values using the upper page and the lower page. The NAND 10 is configured with a plurality of memory chips and each memory chip configured by arraying a plurality of physical blocks as a unit of data erasing. In addition, in the NAND 10, a data writing process and a data reading process are performed for each physical page. The physical block is configured with a plurality of physical pages.

FIG. 2 illustrates a detailed configuration example of the NAND 10. In this embodiment, the NAND 10 includes eight memory chips chip0 to chip7. Each of the memory chips chip0 to chip7 is divided into a plurality of planes. In FIG. 2, each of the memory chips chip0 to chip7 is divided into two areas (Districts), that is, a plane p0 and a plane p1. Each of the plane p0 and the plane p1 includes a plurality of physical blocks BLK. The plane p0 and the plane p1 include independent peripheral circuits (for example, a row decoder, a column decoder, a page buffer, and a data cache) and can erase, write, and read data at the same time.

The RAM 20 includes a storage area serving as a buffer 25 which temporarily stores data when the host 1 writes data to the NAND 10, a storage area which stores and updates management information, such as an address translation table 21, a virtual block management table 22, and a bad block table 23, and a work area which temporarily stores data read from the NAND 10. The management information, such as the address translation table 21, the virtual block management table 22, and the bad block table 23, is obtained by developing the management table 12 stored in the NAND 10 when the memory system starts. In addition, the management information, such as the address translation table 21, the virtual block management table 22, and the bad block table 23, may not be read to a volatile memory, such as the RAM 20, but may be stored, updated, and managed only in the NAND 10.

In the memory system 100, a virtual block is defined as a management unit of a plurality of physical blocks. In this embodiment, the virtual block is obtained by combining the physical blocks such that chip parallelism and plane parallelism are performed. That is, the virtual block is configured with physical blocks corresponding to the product of the number of chips and the number of planes. As illustrated in FIG. 2, when the number of chips is 8 and the number of planes is 2, the virtual block is configured with a maximum of 16 physical blocks. The virtual block is divided into an active block which is being used and an unused free block.

As illustrated in FIG. 3, the logical address transmitted from the host 1 and physical address information are registered in the address translation table 21 managed by the RAM 20 so as to be associated with each other. When the host 1 outputs a read request or a write request to the memory system 100, it inputs the logical address to the memory system 100 through the host interface 2. For example, LBA (Logical Block Addressing) is used as the logical address. The physical address indicates a storage position (a virtual block number and a storage position in the virtual block) on the NAND 10 where data is stored.

As illustrated in FIG. 4, the correspondence among the virtual block number, block configuration information indicating identification information (in this embodiment, 16 identification information items) about a plurality of physical blocks configuring the virtual block, and used/unused information is registered in the virtual block management table 22 managed by the RAM 20. In addition, 16 physical block numbers configuring the logical block are registered in the block configuration information.

In the virtual block management table 22, the used/unused information identifies whether each virtual block is being used, that is, whether each virtual block is a free block or an active block. The free block means an unused block which does not include valid data therein and to which no purpose is allocated. The active block means a block which is being used and includes valid data therein and to which a purpose is allocated. The used/unused information is used to select the free block which is used to write data to the NAND 10. The free block includes a block to which data has never been written and a block in which all of data which has been written once is invalidated. The free block is erased at a predetermined time before it is used as the active block.

FIG. 5 illustrates the bad block table 23 managed by the RAM 20. A congenital bad block and an acquired bad block are registered in the bad block table 23. For example, a physical block number indicating a bad block is registered in the bad block table 23. In some cases, a plurality of physical blocks of the NAND 10 include a bad block which cannot be used as the storage area in a production stage. In addition, in some cases, when the memory system 100 is used, a bad block is generated. The former is referred to as the congenital bad block and the latter is referred to as the acquired bad block. The virtual block is constructed by good physical blocks excluding the bad block.

The management information managed by the address translation table 21, the virtual block management table 22, and the bad block table 23 may be managed by other management methods such as a list structure.

The controller 30 includes a read/write control unit 32, a virtual block construction unit 34, and a block management unit 33.

The read/write control unit 32 performs a process of writing data, which will be written to the NAND 10, to the NAND 10 through the write buffer 25 of the RAM 20 or a work area of the RAM 20 and a process of reading data from the NAND 10. In addition, the read/write control unit 32 performs a process of updating the management table, such as the address translation table 21 or the virtual block management table 22, along with the writing of data to the NAND 10.

When power is turned on for the first time in the production stage, the bad block management unit 33 reads the identification information of the congenital bad block which is registered in a predetermined physical block of the NAND 10 in advance and registers the identification information in the bad block table 23. The bad block management unit 33 updates the bad block table 23 when the acquired bad block is generated while the NAND 10 is being used, for example, during an erase process, during the reading of data, or the writing of data.

The virtual block construction unit 34 performs a process of constructing the virtual block using the bad block table 23 when power is turned on for the first time in the production stage. In addition, the virtual block construction unit 34 performs the process of reconstructing the virtual block using the bad block table 23 when it is determined to be necessary in such a case where the number of the acquired bad blocks exceeds a predetermined threshold value, even when the memory system 100 is used. The process of constructing the virtual block will be described in detail below.

Next, a comparative example will be described with reference to FIG. 6. Each of chips 0 to 7 includes two planes p0 and p1 each of which includes a plurality of physical blocks. Each physical block BLK is represented by a black rectangular frame in FIG. 6. A bad block BB is cross-hatched. For convenience of explanation, the bad blocks are arranged on the lower side. It is assumed that the virtual block is configured with 16 physical blocks.

In the same chip, the physical blocks in different planes can be erased at the same time. Data is read from or written to the physical blocks with the same page number at the same time, which is advantageous in terms of a processing speed or power consumption. Therefore, it is preferable that the virtual block be configured so as to include the physical blocks which belong in different planes in the same chip. Hereinafter, two or more physical blocks which belong in different planes in the same chip number are referred to as a physical block pair. When one chip includes two planes, the physical block pair is configured with two physical blocks selected from each plane. When one chip includes four planes, the physical block pair is configured with two to four physical blocks selected from different planes among four planes.

A first virtual block KBL0 s configured with the physical blocks which are selected one by one from all planes of all chips. Since the physical blocks forming the virtual block KBL0 are arranged in different planes of different chips, the concentration of access to the chip does not occur. Similarly, for the second virtual block KBL1, includes one physical block is selected from each of all planes of all chips.

When a virtual block KBL5 is configured, there is no physical block remaining in chip 7 except for the bad blocks. Therefore, the physical blocks are selected from all of the planes of chip 0 to chip 6 and two physical blocks corresponding to a shortage are acquired from chip 0. When the next virtual block KBL6 is configured, there are physical block pairs in chip 0 to chip 4. In chip 5 and chip 6, the physical block remains only in the plane p0, but no physical block pair remains. Therefore, one physical block pair is added from chip 0 to the virtual block and two physical block pairs are added from chip 1 to the virtual block, instead of the single blocks in chip 5 and chip 6. A physical block that cannot configure a physical block pair because a physical block in the other plane is the bad block BB is referred to as a single block.

In this case, in order to access the virtual block KBL6, chip 0 is accessed two times, chip 1 is accessed three times, and chips 2 to 4 are accessed once.

During accesses to the same chip, after the previous access ends, the next access needs to be performed. Therefore, the time required for access to the virtual block KBL6 is about three times the time required for access to the first virtual block KBL0.

Figure 6:
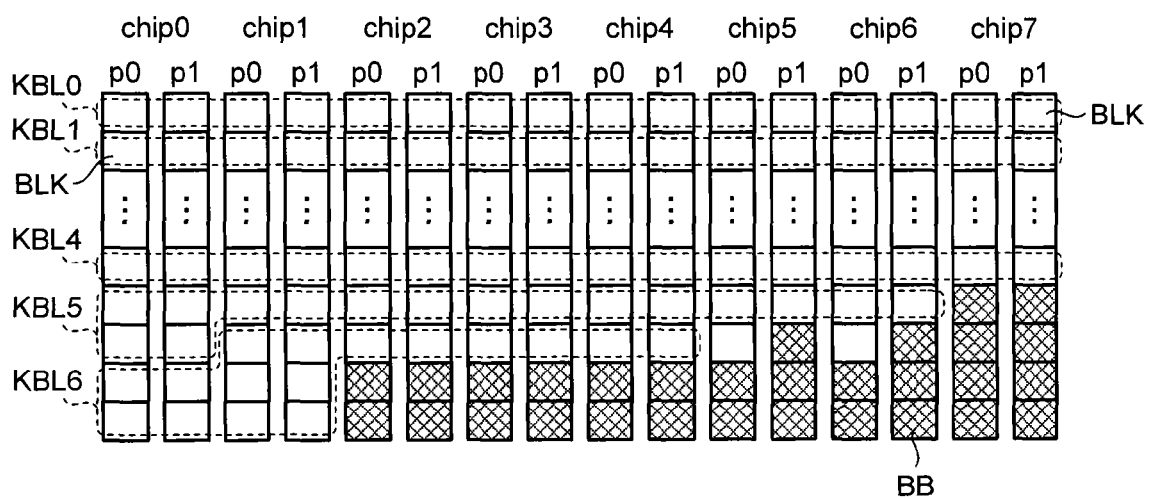
FIG. 6 is a diagram illustrating a virtual block construction process according to a comparative example.
Figure 7:
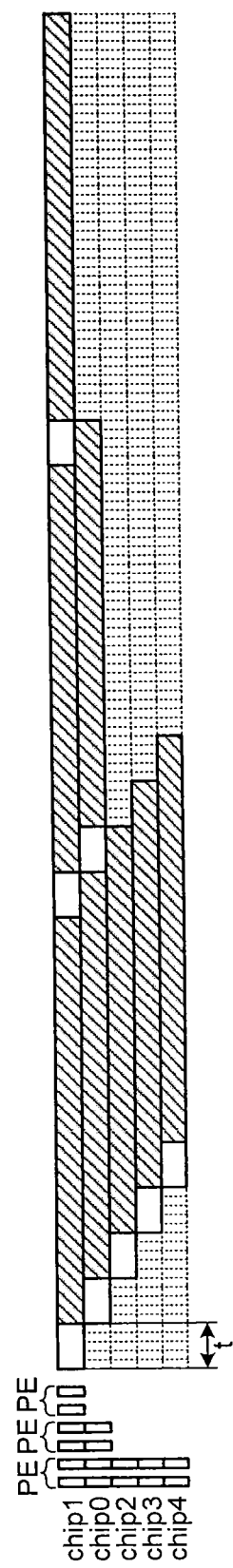
FIG. 7 is a timing chart when a virtual block according to the comparative example is written.

FIG. 7 is a timing chart illustrating write access to each physical page of 16 physical blocks for configuring the virtual block KBL6 illustrated in FIG. 6. In this example, since the buffer 25 on the RAM 20 has low capacity, a time difference t for data buffering occurs during accesses to different chips. When the buffer 25 has high capacity, accesses to different chips are performed at the same time. In FIG. 7, a white portion corresponds to a buffering time and a hatched portion corresponds to a write time to the NAND 10. In FIG. 7, a physical block pair PE is illustrated on the left side, chip 1 includes three physical block pairs, chip 0 includes two physical block pairs, and chips 2 to 4 each include one physical block pair. In chip 1, three accesses occur. In chip 0, two accesses occur. In chips 2 to 4, one access occurs. Access to chip 1 is performed earlier than access to chip 0. The reason is as follows. A total of three accesses are required for chip 1. When one access starts, it is difficult to perform the next access until the previous access ends. Access to the chip which is accessed a large number of times is performed as early as possible. In this way, the total access time is reduced.

As such, in the comparative example illustrated in FIG. 6, the virtual block is constructed while priority is given to the ensuring of the physical block pair. Therefore, in some cases, three accesses to the same chip occur, which results in an increase in the total access time.

Figure 8:
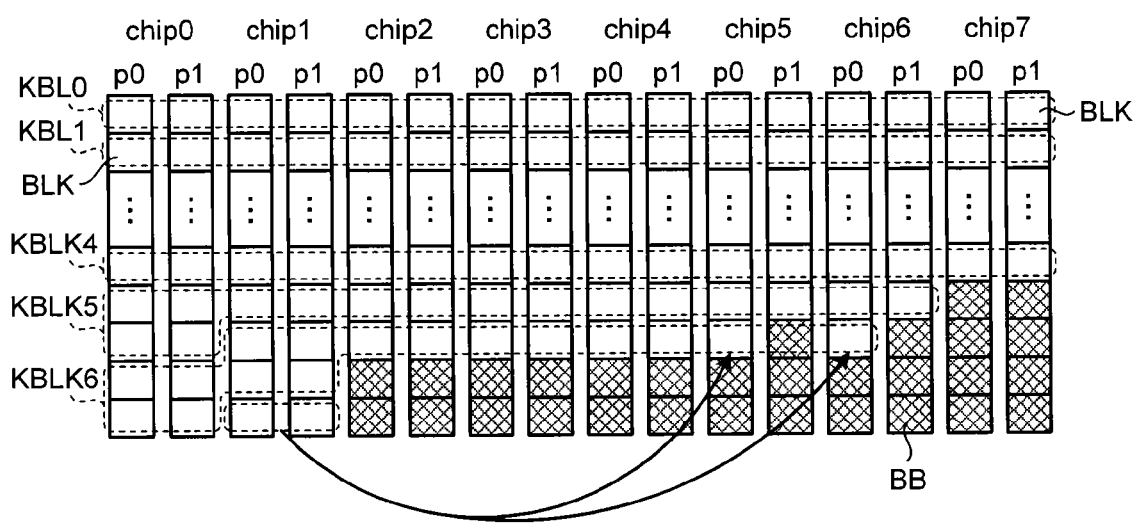
FIG. 8 is a diagram illustrating a virtual block construction process according to this embodiment.

FIG. 8 illustrates the virtual blocks which are constructed by the virtual block construction method according to this embodiment. The example illustrated in FIG. 8 differs from the comparative example illustrated in FIG. 6 only in a combination of the physical blocks in the virtual block KBL6. In FIG. 8, when the virtual block KBL6 is constructed, one physical block is selected from each of chip 5 and chip 6, instead of the accessible physical block pair in the plane p0 and the plane p1 of chip 1. As a result, during access to the virtual block KBL6, chip 0 is accessed two times, chip 1 is accessed two times, and chips 2 to 6 are accessed once.

FIG. 9 is a timing chart illustrating write access to each physical page of 16 physical blocks for configuring the virtual block KBL6 illustrated in FIG. 8. In FIG. 9, chip 0 includes two physical block pairs PE, chip 1 includes two physical block pairs PE, chips 2 to 4 each include one physical block pair PE, and chips 5 and 6 each include a single block sg. That is, in FIG. 9, the blocks of chip 5 and chip 6 for configuring the virtual block KBL6 are not the physical block pair, but are the single blocks sg. Therefore, two accesses occur in chips 0 and 1 and one access occurs in chips 2 to 6. As a result, the number of writing processes increases from eight to nine, as compared to the comparative example illustrated in FIG. 6. However, since the number of accesses to one chip is not greater than two, the total access time is reduced.

In FIG. 1, in the virtual block construction unit 34, a constant N is defined. The virtual block construction unit 34 selects the physical block from each memory chip such that the number of accesses to the same memory chip is not greater than N and constructs the virtual block. As such, the conditions that the number of physical blocks allocated to the same memory chip is less than or equal to a first defined value (N) when a plurality of physical blocks included in the virtual block are selected are referred to as virtual block configuration conditions. In other words, the sum of the number of physical block pairs and the number of single blocks allocated from the same chip to the virtual block needs to be a maximum of N in order to perform a maximum of N accesses to the same chip. These conditions are referred to as virtual block configuration conditions. The process of the virtual block construction unit 34 selecting the physical blocks so as to satisfy the virtual block configuration conditions is arbitrarily performed. The detailed example of the process will be described in a second embodiment.

When power is turned on for the first time in the production stage, the virtual block construction unit 34 acquires bad block information from the bad block table 23, checks, for example, information about the number of good physical blocks in each plane of each chip excluding the bad blocks and the physical block number, and performs a virtual block construction process using the check result. The construction result of the virtual block is registered in the virtual block management table 22. In addition, similarly, the virtual block configuration unit 34 performs a virtual block reconstruction process at an appropriate point of time, for example, at the time when the unused free block is less than a predetermined threshold value. The reconstruction result of the virtual block is registered in the virtual block management table 22.

In FIG. 9, N is fixed to 2 and the number of physical blocks included in the virtual block is 16. However, the numbers are not limited thereto. In this case, similarly to the above, as the value of N is reduced, configuration conditions become stricter. However, as the value of N is reduced, the processing time is reduced.

For example, when the number of physical blocks included in the virtual block is 32, the number of chips is 8, and the value of N is 2, two physical block pairs are ideally collected from each chip. When a virtual block is configured by combining 2 virtual blocks each of which includes 16 physical blocks and in each of which the value of N is 2 as illustrated in FIG. 9, the virtual block is such that 32 physical blocks are included and the value of N is 4. When N is not 4, but is 3, the virtual block is configured by a smaller number of accesses than that when N is 4.

In the first embodiment, the physical block is selected from each chip such that the number of accesses to the same chip is less than or equal to N and the virtual block is constructed. Therefore, the virtual block which takes an excessively long access time to the NAND is removed and it is easy to estimate the total processing time. In addition, even when the NAND has low quality and includes a large number of bad blocks, the possibility that the virtual block will be configured increases and it is possible to stably supply the memory system. In addition, the yield of the memory is improved, which results in a reduction in the overall manufacturing costs. Even when margin capacity is low, it is possible to make the virtual block with high efficiency and thus effectively use margin capacity.

In this embodiment, the number of physical blocks included in all of the virtual blocks is constant (16 or 32). However, the number of physical blocks is not limited to a fixed value of 16, but this embodiment can be applied to a case in which the number of physical blocks is changed to J or more or K or less to configure the virtual block (where J is less than K).

Second Embodiment

In the second embodiment, a method will be described which constructs a virtual block based on virtual block configuration conditions that the number of accesses to the same chip is less than or equal to N. A process according to the second embodiment is performed by a virtual block construction unit 34. In the following description, N is 2.

In the second embodiment, a physical block pair is decomposed into single blocks in order to satisfy the virtual block configuration conditions, if necessary. Specifically, it is considered that, for a chip in which the number of good physical blocks is significantly less than that in other chips, the physical block pair is decomposed into single blocks. The good physical block is not the bad (physical) block, and is used to store data. In a case where there is a significant difference in the number of good physical blocks among the chips, when virtual blocks are sequentially configured without decomposing the physical block pair, the physical blocks in a specific chip remain in the second half of an algorithm and it is difficult to configure the virtual block while satisfying the virtual block configuration conditions.

Therefore, in this embodiment, the state of the blocks from the beginning to the second half of the algorithm is considered. When a very small number of good physical blocks remain in a specific chip from the beginning of the algorithm, the physical block pair is decomposed and a larger number of blocks are allocated to the chip with the larger number of good physical blocks to perform chip dispersion to the end of the algorithm. In this way, the virtual blocks are constructed.

When there is no significant difference in the number of good physical blocks among the chips, the maximum number of virtual blocks B satisfying the virtual block configuration conditions is (the total number of good physical blocks)/(the number of physical blocks included in the virtual block).

According to the virtual block configuration conditions that the number of accesses to each chip is not grater than N(=2), for each chip, the physical blocks in one of a plane p0 and a plane p1 which has a larger number of good physical blocks and in which the number of good physical blocks is more than two times the maximum number of virtual blocks B are not used to configure the virtual block.

In addition, according to the virtual block configuration conditions that the number of accesses to each chip is not grater than N(=2), for each chip, the physical block pair is decomposed such that the number of physical block pairs or single blocks equal to or less than two times the remaining number of virtual blocks to be configured remains, if necessary. In this way, it is possible to disperse a plurality of chips in each virtual block.

Figure 10:
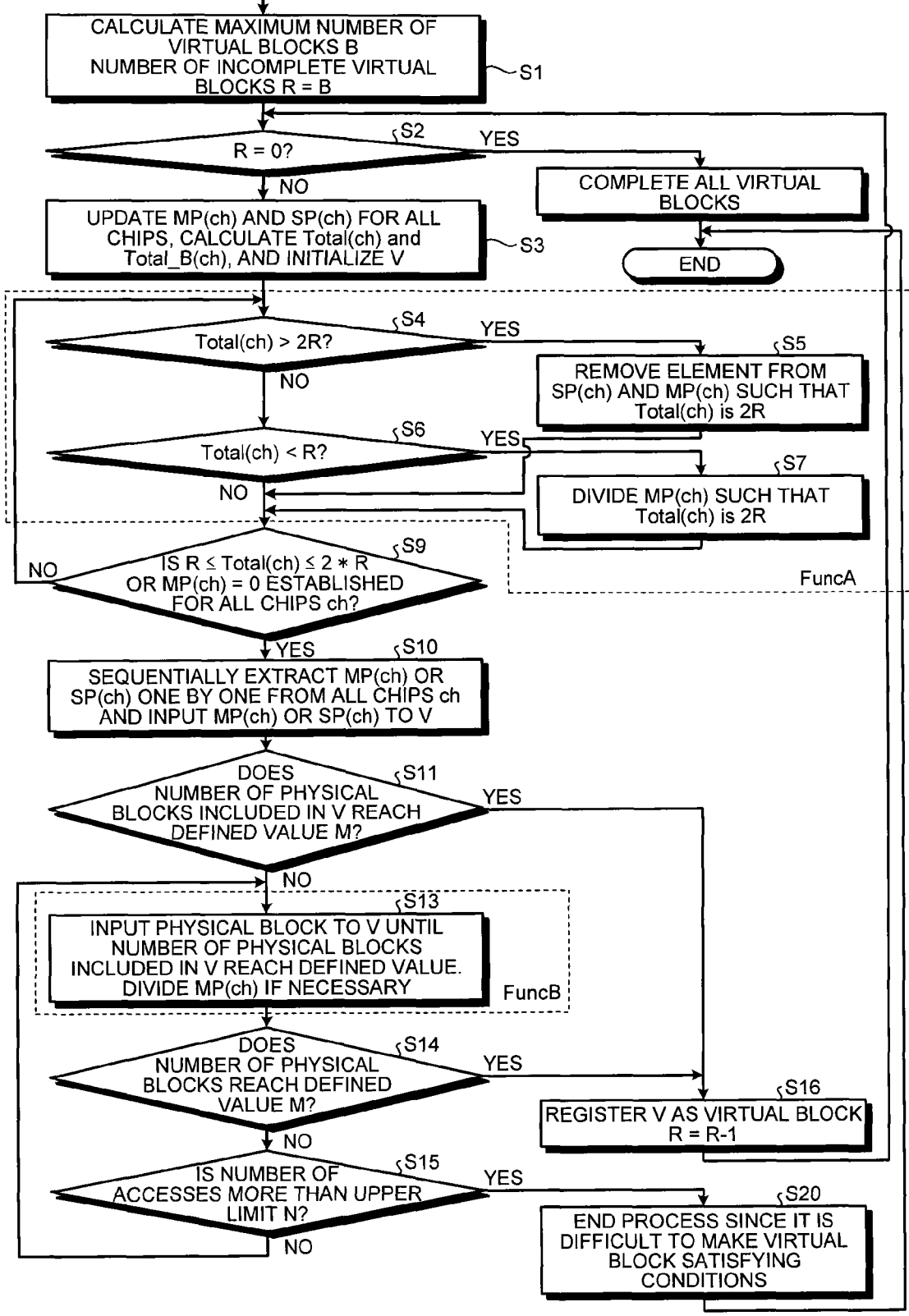
FIG. 10 is a flowchart illustrating the virtual block construction process.

FIG. 10 is a flowchart illustrating a virtual block construction process according to this embodiment. The following process is performed by the virtual block construction unit 34.

First, the maximum number of virtual blocks B is calculated as follows:

B=the total number of good physical blocks/the number of physical blocks in each virtual block, and the remaining number of virtual blocks R is equal to B (Step S1).

When the remaining number of virtual blocks R is 0, all possible virtual blocks are configured and the process ends. When R is not 0, the process proceeds to Step S3.

It is assumed that, in each memory chip, a set of the blocks which can configure the physical block pair, that is, a set of blocks capable of performing multi-plane writing is MP(ch) and a set of the single blocks incapable of performing multi-plane writing is SP(ch). Here, 'ch' corresponds to a chip. When the numbers of elements in the sets are represented by |MP(ch)| and |SP(ch)|, the total number of elements in each chip is as follows: Total(ch)=|MP(ch)|+|SP(ch)|. When the total number of physical blocks included in each memory chip is Total_B(ch), Total_B(ch)=|MP(ch)|×2+|SP(ch)| is established. In addition, a virtual block set which temporarily stores the selected physical block pair and single block is referred to as a virtual block set.

In Step S3, MP(ch) and SP(ch) are updated, Total(c h) and Total_B(ch) are calculated, and the virtual block set V is initialized.

Then, it is determined whether Total(ch)>2*R or not for all chips (Step S4). When Total(ch)>2*R is satisfied (Yes in Step S4), (Total(ch)−2*R) elements are not used to configure the virtual block. While Total(ch)>2*R is satisfied, the elements are removed from SP(ch). When Total(ch)>2*R is satisfied even though all elements of SP(ch) are removed, elements are removed from MP(ch) (Step S5). Total(ch)=2*R is established by Step S5.

When Total(ch)<R is satisfied (NO in Step S6), elements mp of MP(ch) are extracted one by one until Total(ch)=R is established. The element is divided into two single blocks sp0 and sp1 and the divided single blocks sp0 and sp1 are moved to the single block set SP(ch) (Step S7). In Step 7, when Total(ch)<R is satisfied even though all MPs(ch) are divided, the division process ends at that time.

Steps S4 to S7 are a block adjustment process FuncA, in which the single block and the physical block pair which are not virtual block construction targets are excluded and the physical block pair is divided.

By the block adjustment process FuncA of Steps S4 to S7, R≤Total(ch)≤2*R is satisfied or MP(ch) is an empty set for all chips.

In Step S9, it is determined whether R≤Total(ch)≤2*R is satisfied or MP(ch) is an empty set and Steps S4 to S7 are performed until the determination condition is satisfied.

Then, one element of MP(ch) is extracted from all of the memory chips and one element of SP(ch) is extracted from the chip in which MP(ch) is an empty set. Then, the extracted elements are input to the virtual block set V (Step S10).

Then, it is determined whether the number of physical blocks included in the virtual block set V reaches a defined value M (the number of physical blocks in each virtual block) (Step S11). When the number of physical blocks reaches the defined value M, the virtual block set V is registered as a virtual block in the virtual block management table 22. In addition, the remaining number of virtual blocks R is reduced by one (Step S16).

When the determination result in Step S11 is 'No', the physical block is extracted from the chip with large Total_B (ch) among the chips which are designated a number of times that is not larger than an upper limit N(=2) and is then input to the virtual block set V. When there is a plurality of chips with the same Total_B(ch), the chip with the largest Total(ch) is selected. At that time, when there is an element in SP(ch), the element of SP(ch) is input to the virtual block set V. When SP(ch) is an empty set, the element of MP(ch) is extracted and is then divided into two single blocks sp0 and sp1. One of the two single blocks is input to the virtual block set V and the other single block is input to SP(ch) (Step S13).

In Step S14, it is determined whether the number of physical blocks included in the virtual block set V reaches the defined value M (the number of physical blocks in each virtual block) (Step S11). When the number of physical blocks reaches the defined value M, the virtual block set V is registered as a virtual block in the virtual block management table 22. The remaining number of virtual blocks R is reduced by one (Step 16).

In Step S15, it is determined whether the number of accesses by the current virtual block is more than an access upper limit (N=2). When the number of accesses is more than the access upper limit N, it is determined that it is impossible to make the virtual block satisfying the virtual block configuration conditions and the process ends (Step S20). Until the number of accesses is more than the access upper limit (N=2) or until the number of physical blocks reaches the defined value M, Steps S13 to S15 are repeatedly performed.

Next, the process illustrated in FIG. 10 will be described with reference to the examples illustrated in FIGS. 11 to 24. FIGS. 11 to 24 illustrate eight chips (chips 0 to 7) which can be processed in parallel. One block corresponds to an element. The block having 2 written therein is an element of MP(ch) and the block having 1 written therein is an element of SP(ch).

Figure 11:
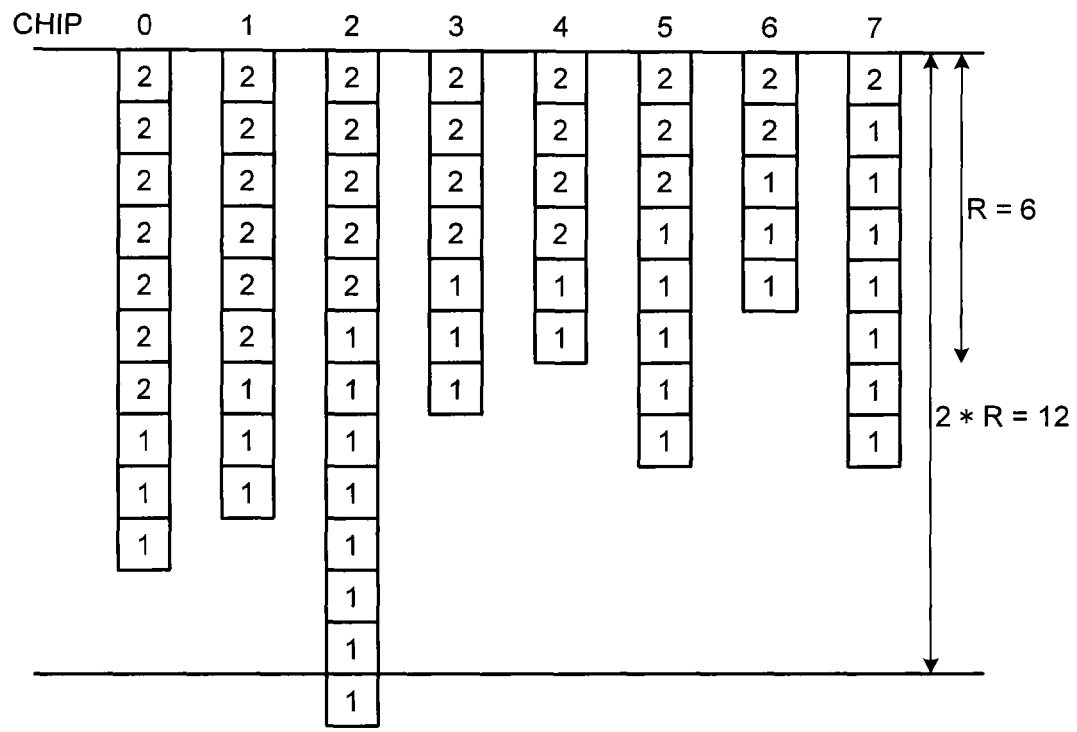
FIG. 11 is a conceptual diagram illustrating a detailed example of the virtual block construction process.

The virtual block construction unit 34 calculates the maximum number of virtual blocks B (Step S1). FIG. 11 illustrates the state of the blocks of each chip in the initial state. In FIG. 11, when the total sum of MP(ch) and SP(ch) in all chips 0 to 7 is calculated, the total number of physical blocks is 98 and the number of physical blocks included in the virtual block is 16. Therefore, the maximum value B is 98/16=6. At that time, the remaining number of virtual blocks R is 6.

The virtual block construction unit 34 calculates the number of elements Total(ch) in all chips and the number of physical blocks Total_B(ch) in all chips (Steps S2 and S3). In FIG. 11, it is assumed that chip 0, chip 1, chip 2, chip 3, . . . , chip 7 are arranged in this order from the left end. Total(0)=|MP(0)|+|SP(0)|=7+3=10, Total(1)=6+3=9, Total(2)=5+8=13, Total(3)=4+3=7, Total(4)=4+2=6, Total(5)=3+5=8, Total(6)=2+3=5, and Total(7)=1+7=8 are established. Total_B(0)=|MP(1)|×2+|SP(1)|=17, Total_B(1)=15, Total_B(2)=18, Total_B((3)=11, Total_B((4)=10, Total_B((5)=11, Total_B(6)=7, and Total_B(7)=9 are established.

Figure 12:
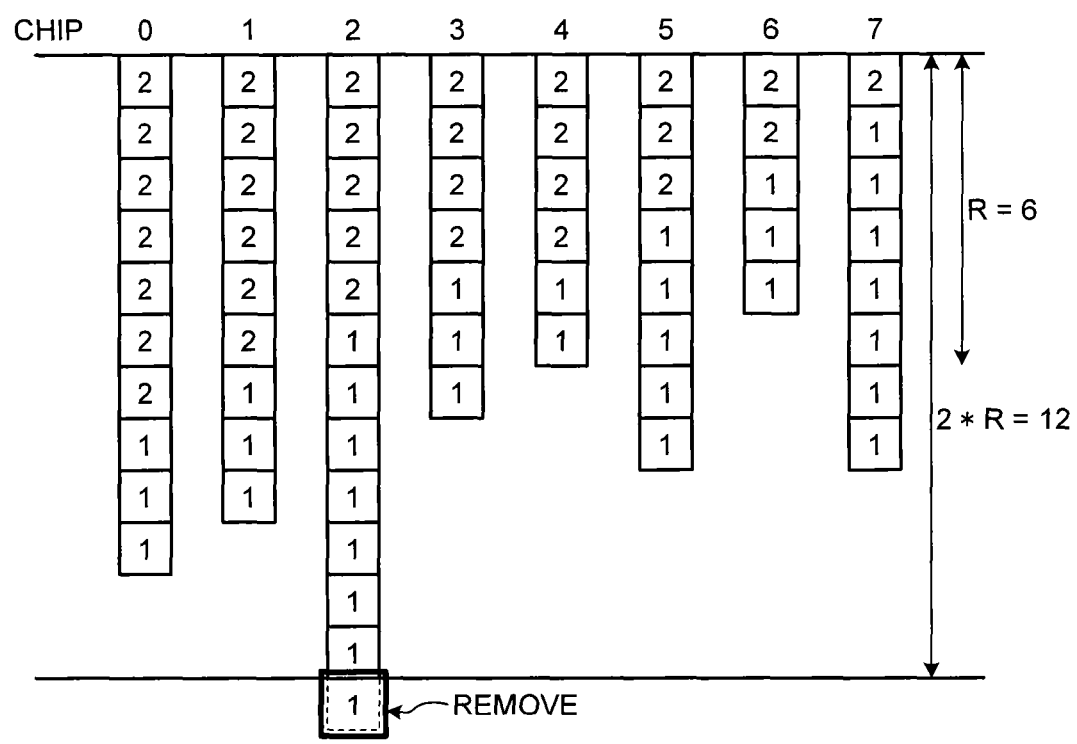
FIG. 12 is a conceptual diagram illustrating the detailed example of the virtual block construction process.

In the first state, since the number of elements in chip 2 is 13, Total(ch)>2*R is established in Step S4. Therefore, the virtual block construction unit 34 removes one single element from SP(2) of chip 2, as illustrated in FIG. 12.

Figure 13:
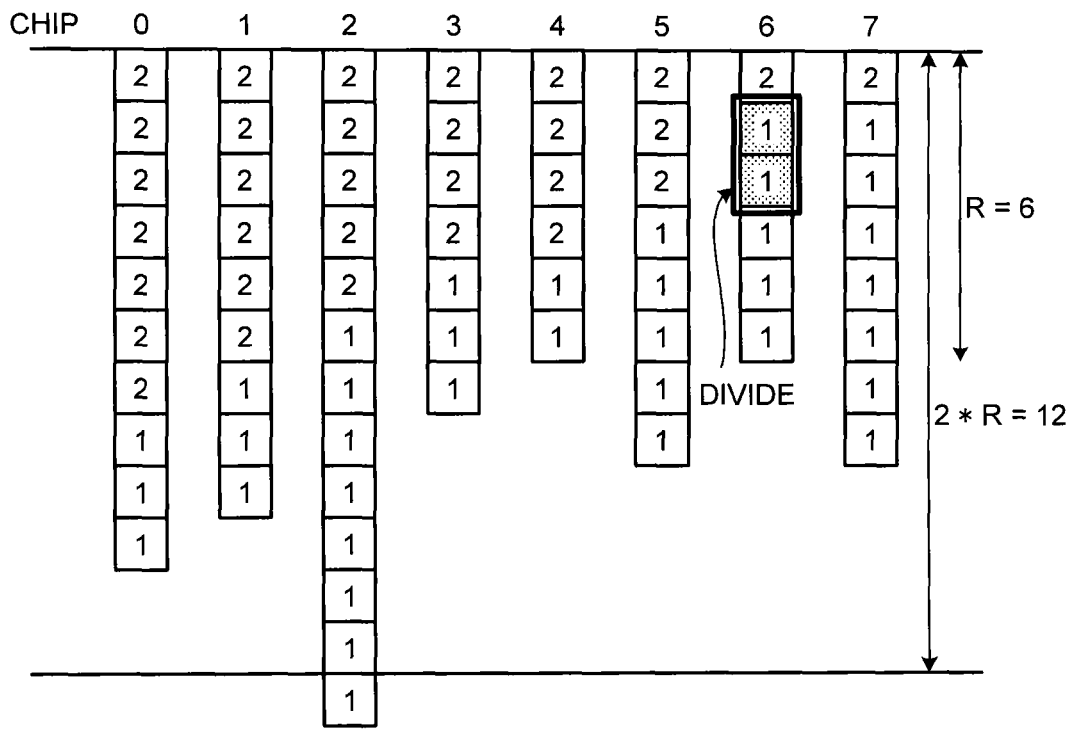
FIG. 13 is a conceptual diagram illustrating the detailed example of the virtual block construction process.

Since the number of elements in chip 6 is 5, Total(ch)<R is established in Step S6. Therefore, the virtual block construction unit 34 extracts one element mp of MP(6), divides the element into two single blocks sp0 and sp1, and moves the divided single blocks to SP(6) until Total(6) is R, as illustrated in FIG. 13 (Step S7).

Figure 14:
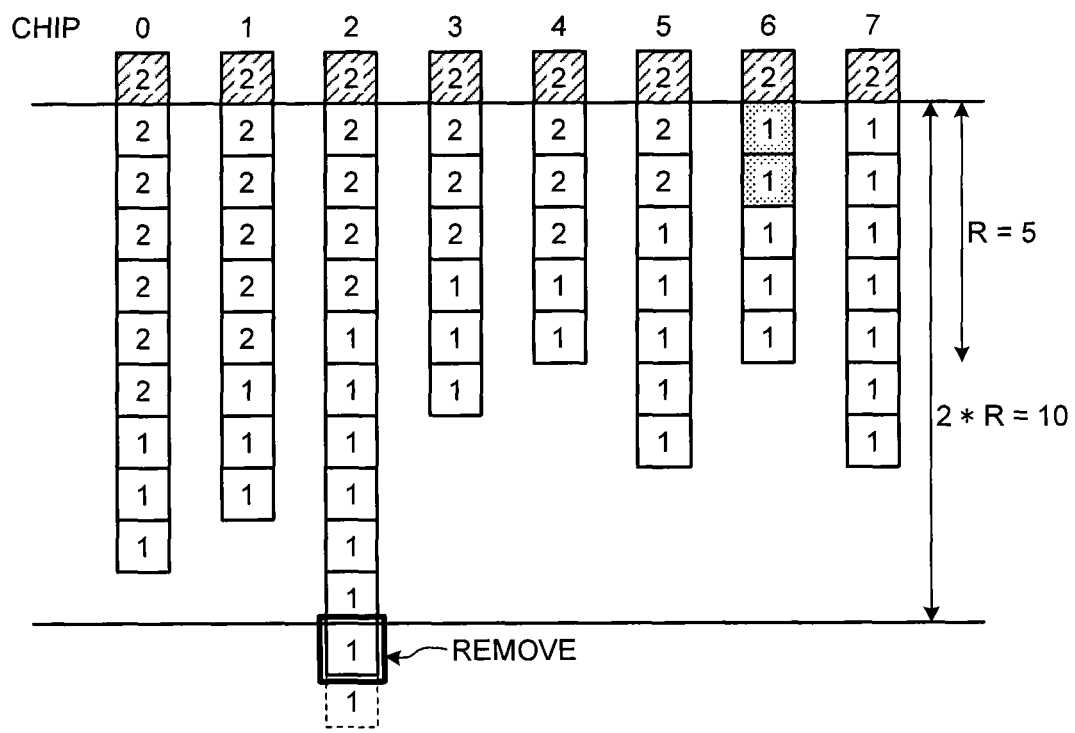
FIG. 14 is a conceptual diagram illustrating the detailed example of the virtual block construction process.

In all memory chips, since the conditions of Step S9 are satisfied, the virtual block construction unit 34 extracts MP(ch) one by one from all chips and inputs MP(ch) to the virtual block set V, as illustrated in FIG. 14. Since the number of physical blocks included in the virtual block set V is 16 (Step S11), the virtual block construction unit 34 registers the virtual block set V as a virtual block in the virtual block management table 22 and reduces the remaining number of virtual blocks R by one such that R is 5 (Step S16). The physical blocks included in the virtual block which is registered in the virtual block management table 22 are hatched.

Then, the virtual block construction unit 34 updates MP(ch) and SP(ch), calculates Total(ch) and Total_B(ch), and initializes the virtual block set V (Step S3). Total(0)=6+3=9, Total(1)=5+3=8, Total(2)=4+7=11, Total(3)=3+3=6, Total(4)=3+2=5, Total(5)=2+5=7, Total(6)=0+5=5, and Total (7)=0+7=7 are established. Total_B(0)=15, Total_B(1)=13, Total_B(2)=15, Total_B(3)=9, Total_B(4)=8, Total_B(5)=9, Total_B(6)=5, and Total_B((7)=7 are established.

Figure 15:
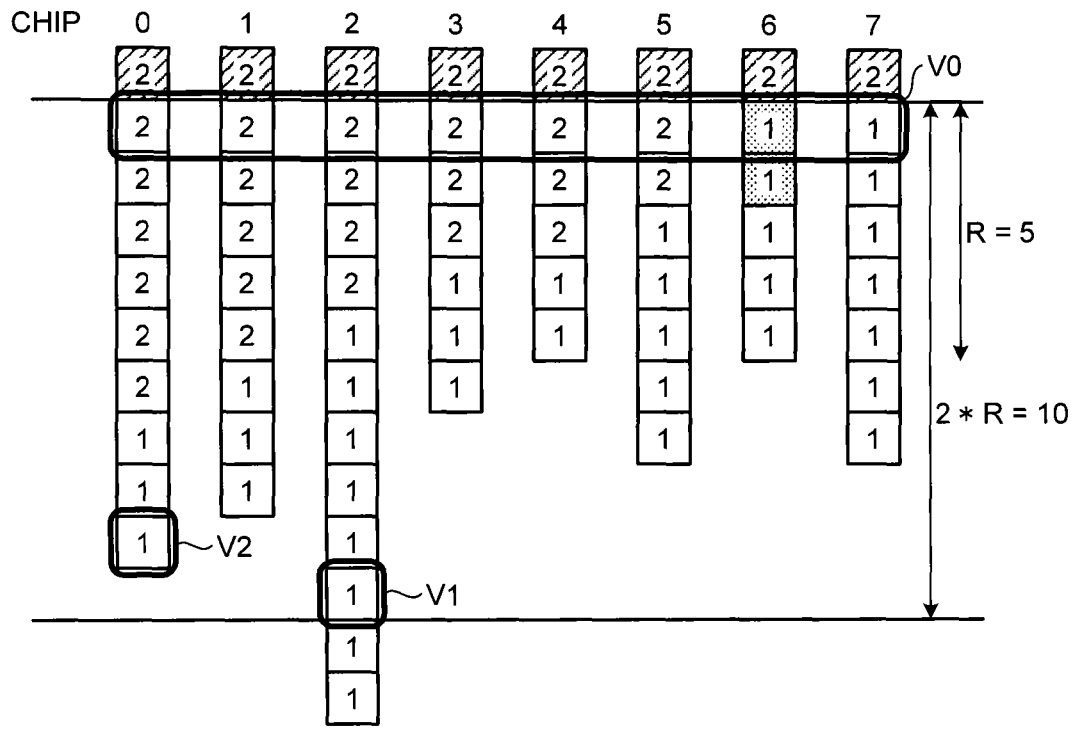
FIG. 15 is a conceptual diagram illustrating the detailed example of the virtual block construction process.

In the state illustrated in FIG. 14, since R is 5 and the number of elements in chip 2 is 11, Total(ch)>2*R is established in Step S4. Therefore, the virtual block construction unit 34 removes one single element from SP(2) of chip 2, as illustrated in FIG. 14. In the state illustrated in FIG. 14, in all chips, since Total(ch)<5 is not established in Step S6, the virtual block construction unit 34 sequentially extracts one element of MP(ch) from all chips, extracts an element of SP(ch) from the chip in which MP(ch) is an empty set, and inputs the extracted elements to the virtual block set V in Step S10, as illustrated in FIG. 15. As illustrated in FIG. 15, six physical block pairs and two single blocks represented by V0 are input to the virtual block set V by the process in Step S10.

The number of physical blocks which are represented by V0 and are input to the virtual block set V is 14 and two more physical blocks are needed (Step S11). Therefore, in Step S13, the virtual block construction unit 34 extracts the physical blocks from the chip with large Total_B(ch) and inputs the physical blocks to the virtual block set V. When there is a plurality of chips with the same Total_B(ch), the chip with the largest Total(ch) is selected. In the state illustrated in FIG. 15, first, chip 2 with the largest Total_B(ch) is selected. One single block V1 is selected from chip 2 and is then input to the virtual block set V. Then, one single block V2 is selected from chip 0 with the second largest Total_B(ch) and is then input to the virtual block set V. Since the number of physical blocks in the virtual block set V including V0, V1, and V2 is 16 (Step S11), the virtual block construction unit 34 registers the virtual block set V as a virtual block in the virtual block management table 22 and reduces the remaining number of virtual blocks R by one such that R is 4 (Step S16).

Figure 16:
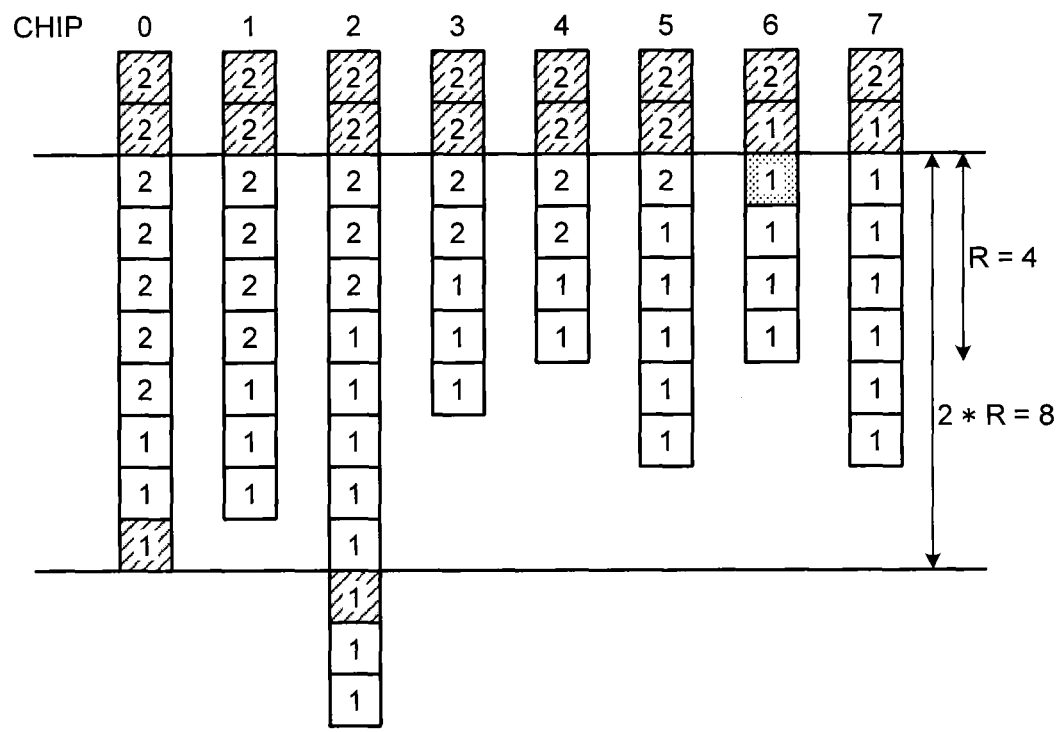
FIG. 16 is a conceptual diagram illustrating the detailed example of the virtual block construction process.
Figure 17:
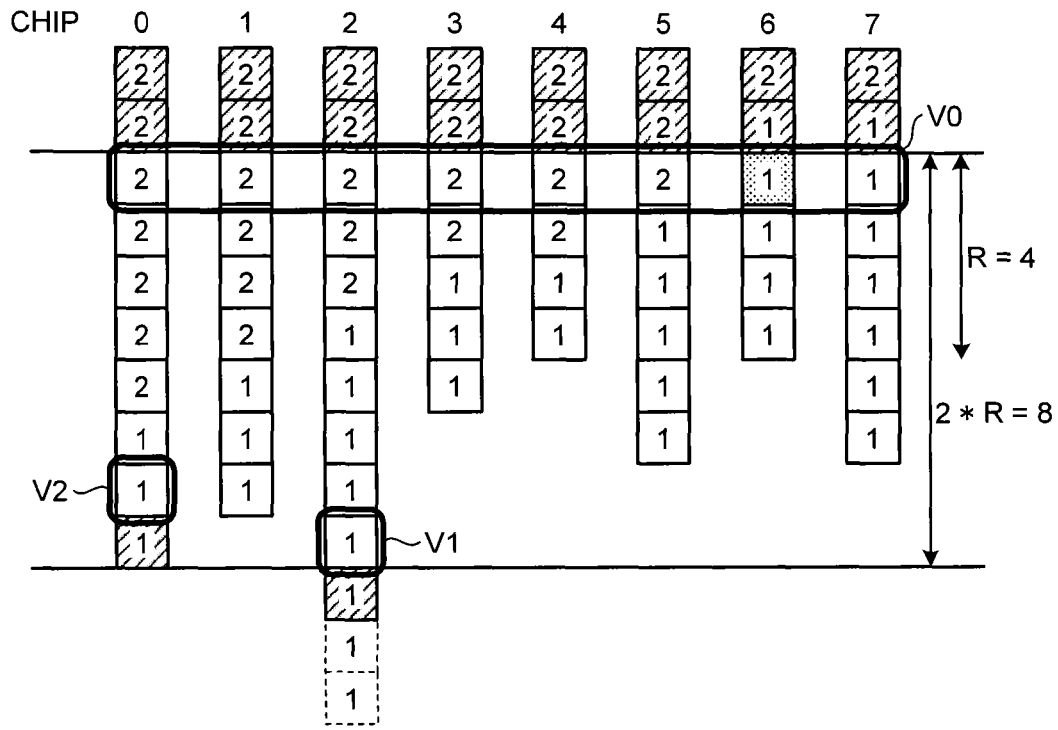
FIG. 17 is a conceptual diagram illustrating the detailed example of the virtual block construction process.

In the state illustrated in FIG. 16, R is 4 and Total(ch)>2*R in Step S4 and Total(ch)<4 in Step S6 are not established in all chips. Therefore, in Step S10, the virtual block construction unit 34 sequentially extracts one element of MP(ch) from all chips, extracts one element of SP(ch) from the chip in which MP(ch) is an empty set, and inputs the extracted elements to the virtual block set V, as illustrated in FIG. 17. As illustrated in FIG. 17, six physical block pairs and two single blocks which are represented by V0 are input to the virtual block set V by the process in Step S10.

The number of physical blocks which are represented by V0 and are input to the virtual block set V is 14 and two more physical blocks are needed (Step S11). Therefore, in Step S13, the virtual block construction unit 34 extracts the physical blocks from the chip with large Total_B(ch) and inputs the physical blocks to the virtual block set V. When there is a plurality of chips with the same Total_B(ch), the chip with the largest Total(ch) is selected. In the state illustrated in FIG. 17, first, chip 2 with the largest Total_B(ch) is selected. One single block V1 is selected from chip 2 and is then input to the virtual block set V. Then, of chip 0 and chip 1 with the second largest Total_B(ch), chip 0 with the larger Total(ch) is selected. One single block V2 is selected from chip 0 and is then input to the virtual block set V. Since the number of physical blocks in the virtual block set V including V0, V1, and V2 is 16 (Step S11), the virtual block construction unit 34 registers the virtual block set V as a virtual block in the virtual block management table 22 and reduces the remaining number of virtual blocks R by one such that R is 3 (Step S16).

Figure 18:
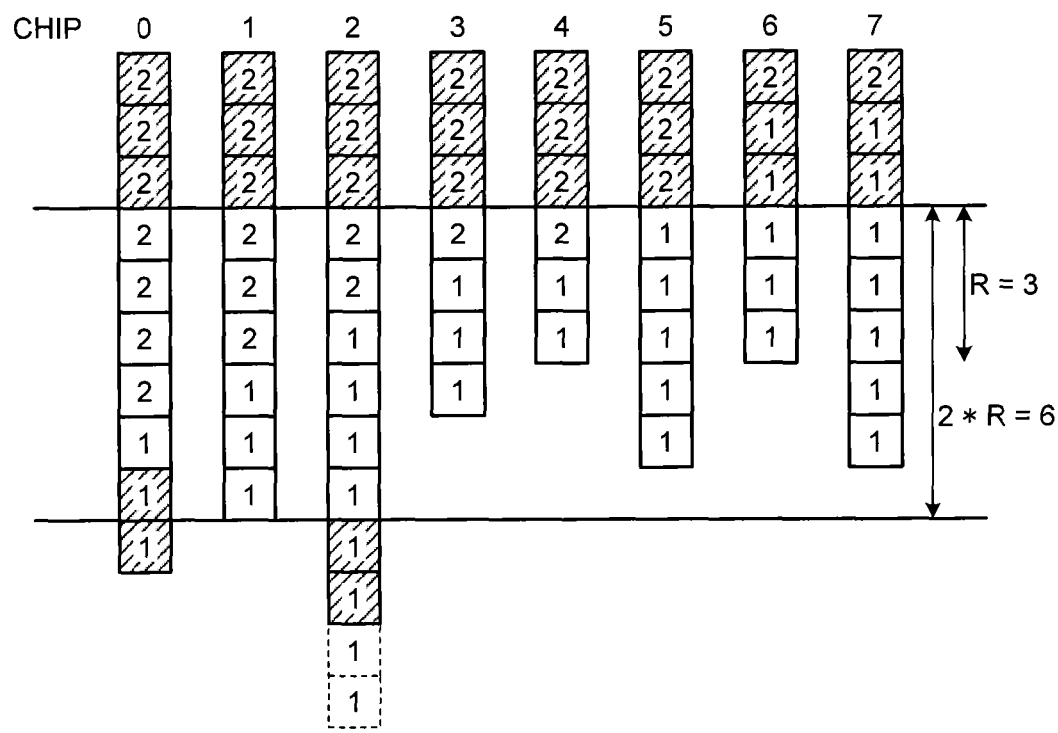
FIG. 18 is a conceptual diagram illustrating the detailed example of the virtual block construction process.
Figure 19:
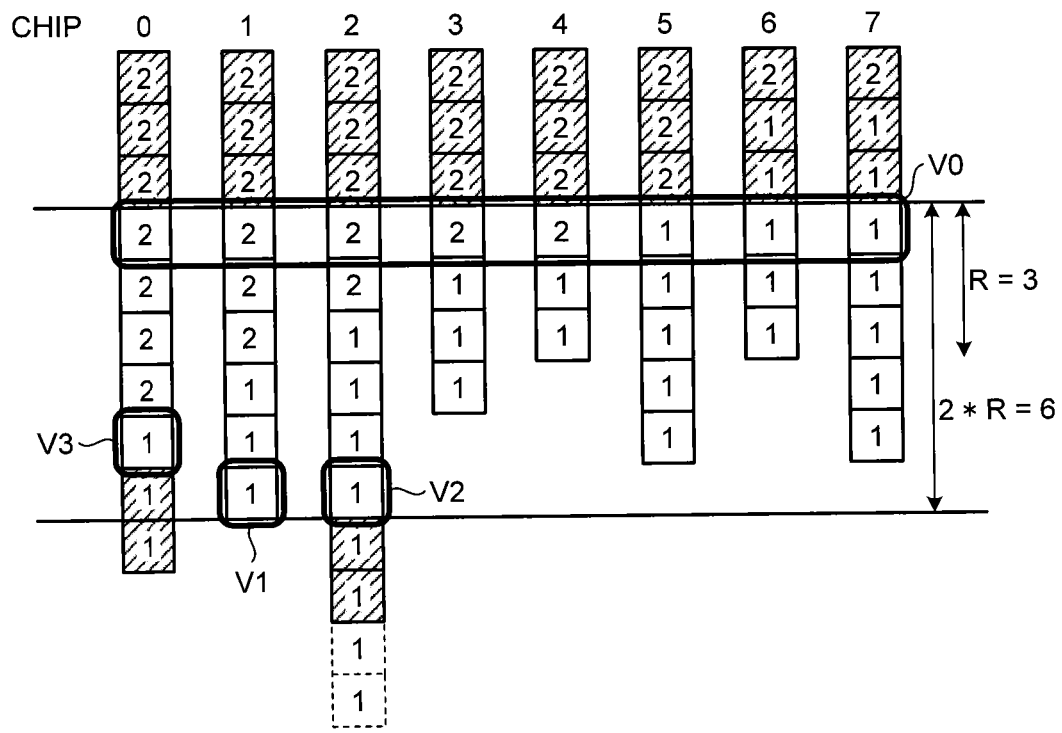
FIG. 19 is a conceptual diagram illustrating the detailed example of the virtual block construction process.

In the state illustrated in FIG. 18, R is 3 and Total(ch)>2*R in Step S4 and Total(ch)<3 in Step S6 are not established in all chips. Therefore, in Step S10, the virtual block construction unit 34 sequentially extracts one element of MP(ch) from all chips, extracts one element of SP(ch) from the chip in which MP(ch) is an empty set, and inputs the extracted elements to the virtual block set V, as illustrated in FIG. 19. As illustrated in FIG. 19, five physical block pairs and three single blocks which are represented by V0 are input to the virtual block set V by the process in Step S10.

The number of physical blocks which are represented by V0 and are input to the virtual block set V is 13 and three more physical blocks are needed (Step S11). Therefore, in Step S13, the virtual block construction unit 34 extracts the physical blocks from the chip with large Total_B(ch) and inputs the physical blocks to the virtual block set V. When there is a plurality of chips with the same Total_B(ch), the chip with the largest Total(ch) is selected. In the state illustrated in FIG. 19, first, of chip 1 and chip 2 with the largest Total_B(ch), chip 1 with the larger Total(ch) is selected. One single block V1 is selected from chip 1 and is then input to the virtual block set V. Then, of chip 1 and chip 2 with the largest Total_B(ch), chip 2 with the smaller Total(ch) is selected. One single block V2 is selected from chip 2 and is then input to the virtual block set V. Among chip 0, chip 5, and chip 7 with the second largest Total_B(ch), chip 0 with the largest Total(ch) is selected. One single block V3 is selected from chip 0 and is then input to the virtual block set V. Since the number of physical blocks in the virtual block set V including V0, V1, V2, and V3 is 16 (Step S11), the virtual block construction unit 34 registers the virtual block set V as a virtual block in the virtual block management table 22 and reduces the remaining number of virtual blocks R by one such that R is 2 (Step S16).

Figure 20:
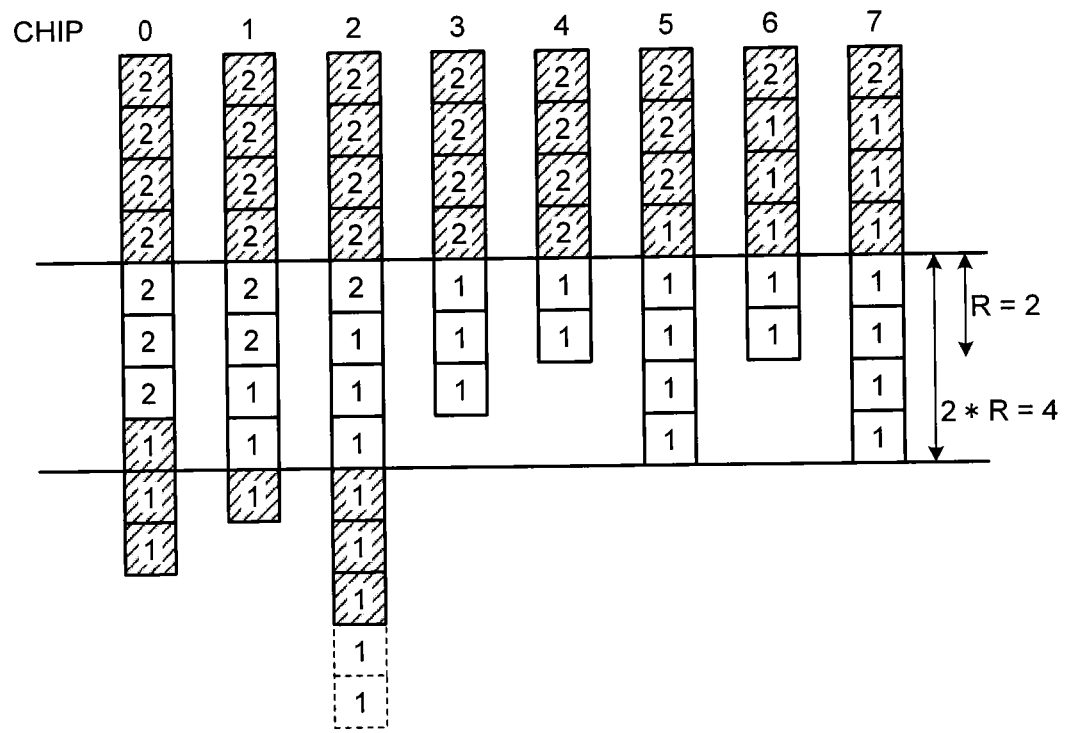
FIG. 20 is a conceptual diagram illustrating the detailed example of the virtual block construction process.
Figure 21:
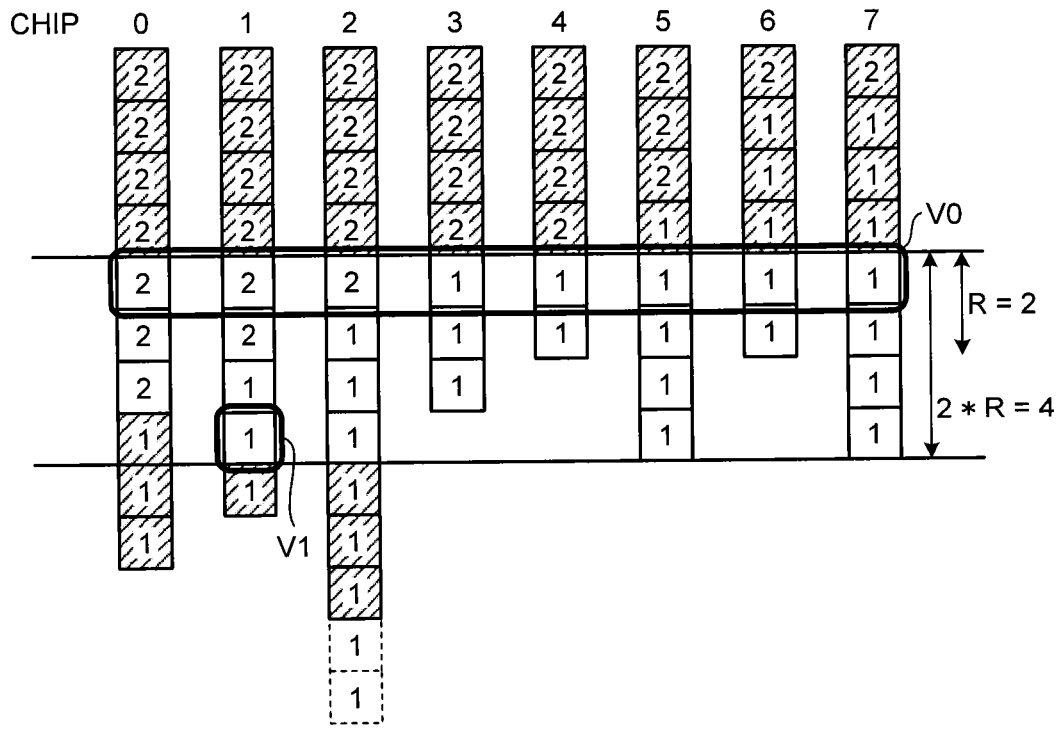
FIG. 21 is a conceptual diagram illustrating the detailed example of the virtual block construction process.

In the state illustrated in FIG. 20, R is 2 and Total(ch)>2*R in Step S4 and Total(ch)<2 in Step S6 are not established in all chips. Therefore, in Step S10, the virtual block construction unit 34 sequentially extracts one element of MP(ch) from all chips, extracts one element of SP(ch) from the chip in which MP(ch) is an empty set, and inputs the extracted elements to the virtual block set V, as illustrated in FIG. 21. As illustrated in FIG. 21, three physical block pairs and five single blocks which are represented by V0 are input to the virtual block set V by the process in Step S10.

Figure 22:
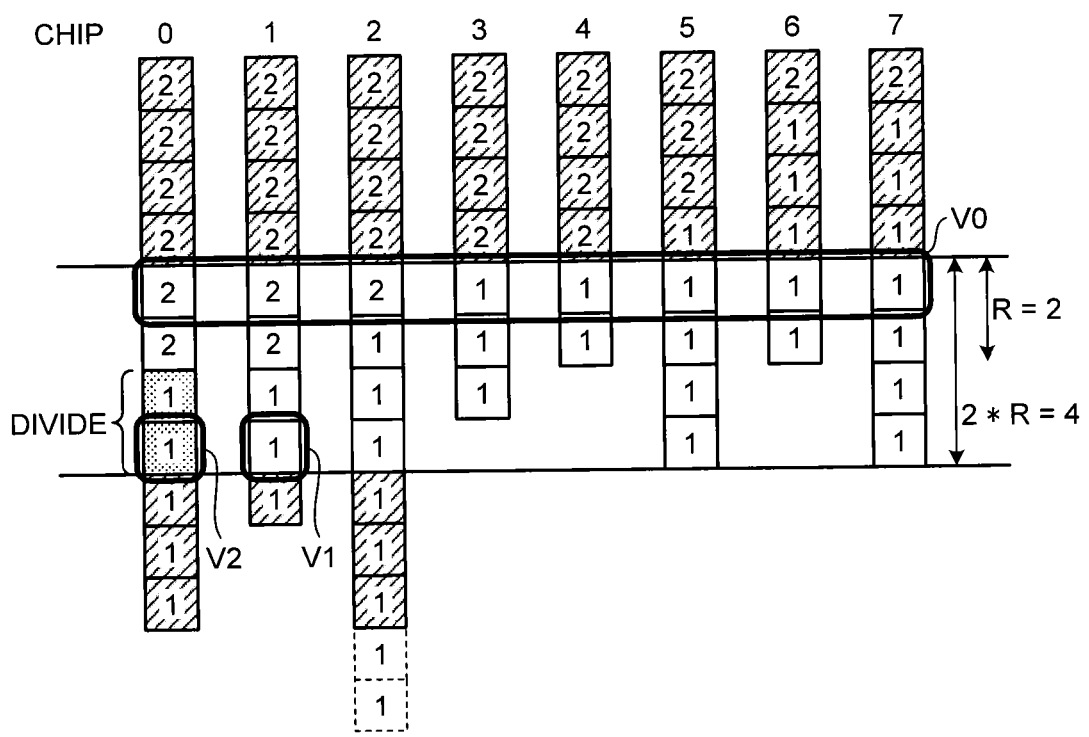
FIG. 22 is a conceptual diagram illustrating the detailed example of the virtual block construction process.
Figure 23:
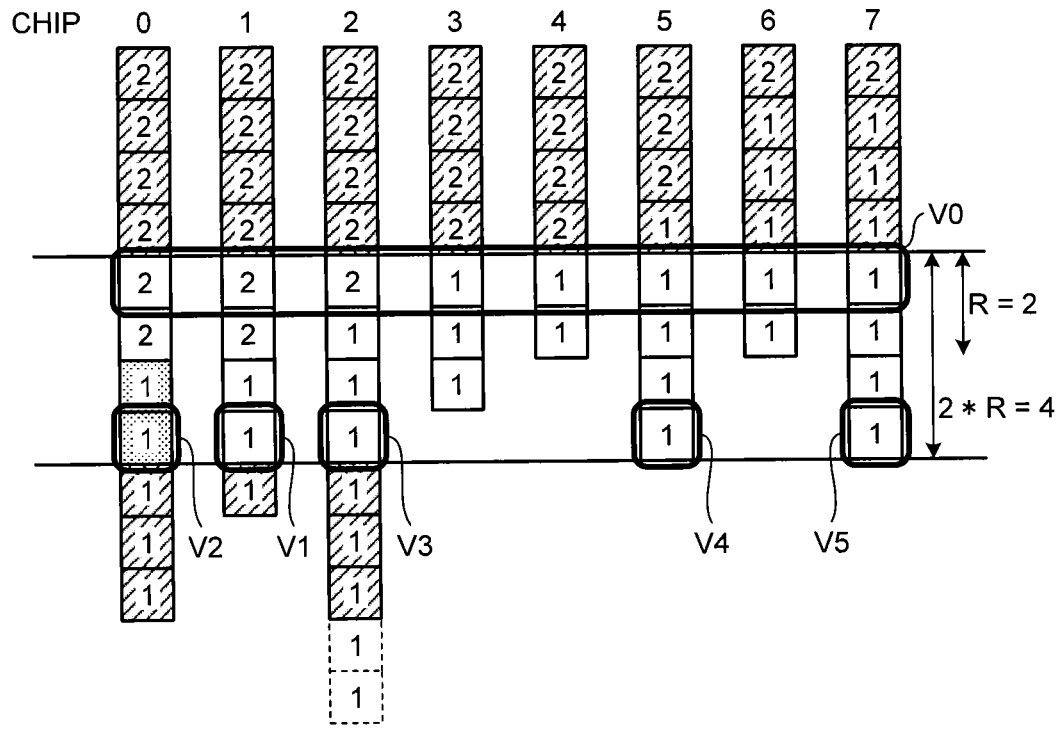
FIG. 23 is a conceptual diagram illustrating the detailed example of the virtual block construction process.

The number of physical blocks which are represented by V0 and are input to the virtual block set V is 11 and five more physical blocks are needed (Step S11). Therefore, in Step S13, the virtual block construction unit 34 extracts the physical blocks from the chip with large Total_B(ch) and inputs the physical blocks to the virtual block set V. When there is a plurality of chips with the same Total_B(ch), the chip with the largest Total(ch) is selected. When SP(ch) is an empty set, the virtual block construction unit 34 extracts an element of MP(ch), divides the element into two single blocks sp0 and sp1, inputs one of the two single blocks to the virtual block set V, and inputs the other single block to SP(ch). In the state illustrated in FIG. 21, first, of chip 0 and chip 1 with the largest Total_B(ch), chip 1 with the larger Total(ch) is selected. One single block V1 is selected from chip 1 and is then input to the virtual block set V. Then, as illustrated in FIG. 22, in chip 0 with the largest Total_B(ch), since SP(1) is an empty set, one element mp of MP(1) is extracted and is divided into two single blocks sp0 and sp1 and the two single blocks sp0 and sp1 are moved to SP(1). Then, one divided single block V2 is selected from chip 0 and is then input to the virtual block set V. As illustrated in FIG. 23, single blocks V3, V4, and V5 are selected from chip 2, chip 5, and chip 7, respectively.

Figure 24:
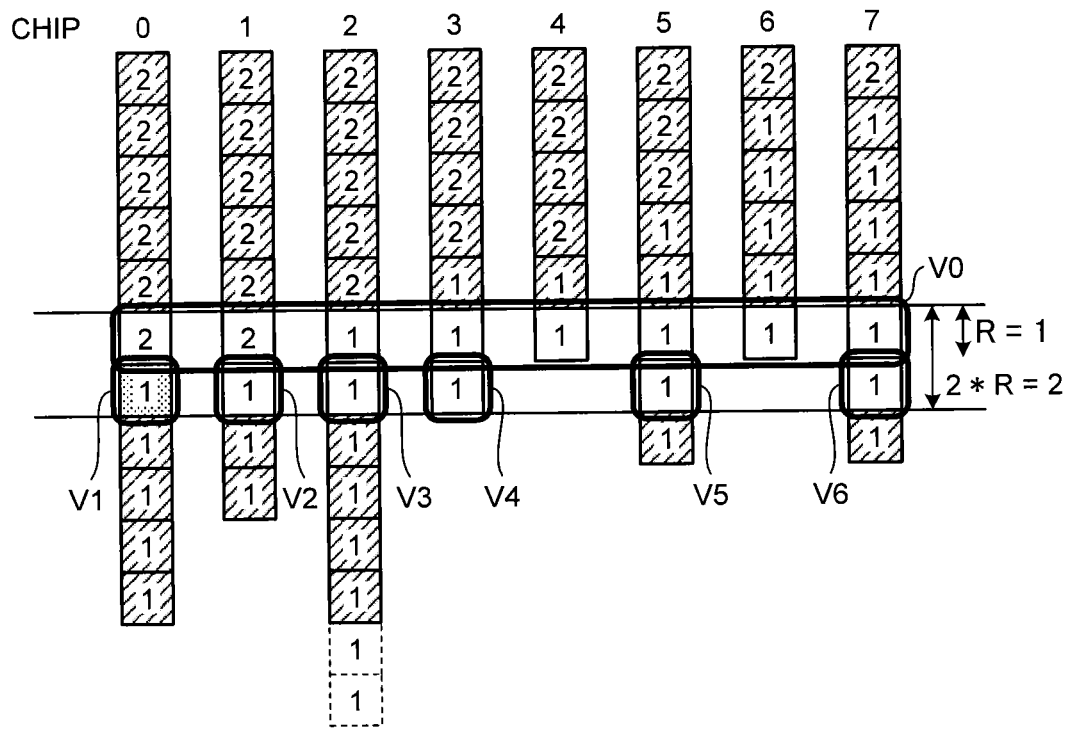
FIG. 24 is a conceptual diagram illustrating the detailed example of the virtual block construction process.

In the state illustrated in FIG. 24, R is 1 and Total(ch)>2*R in Step S4 and Total(ch)<1 in Step S6 are not established in all chips. Therefore, in Step S10, the virtual block construction unit 34 sequentially extracts one element of MP(ch) from all chips, extracts one element of SP(ch) from the chip in which MP(ch) is an empty set, and inputs the extracted elements to the virtual block set V, as illustrated in FIG. 24. As illustrated in FIG. 24, two physical block pairs and six single blocks which are represented by V0 are input to the virtual block set V by the process in Step S10.

The number of physical blocks which are represented by V0 and are input to the virtual block set V is 10 and six more physical blocks are needed (Step S11). The virtual block construction unit 34 repeatedly performs Step S13 to sequentially input the single blocks V1, V2, V3, V4, V5, and V6 to the virtual block set V. Since the number of physical blocks in the virtual block set V including V0 to V6 is 16 (Step S11), the virtual block construction unit 34 registers the virtual block set V as a virtual block in the virtual block management table 22 and reduces the remaining number of virtual blocks R by one such that R is 0 (Step S16). Since R is 0 in Step S2, the virtual block construction process ends.

In this way, it is possible to make six virtual blocks on condition that the number of accesses to the NAND 10 is reduced to two or less.

Next, the basis of the decomposition of the physical block pair in the virtual block construction process will be described conceptually below. In this algorithm, for a chip with a small number of good physical blocks, the blocks of the chip are allocated so as to be included in all virtual blocks as uniformly as possible. For example, the good physical blocks of the chip with a small number of good physical blocks intend to be dispersed in the calculated remaining number of virtual blocks R. Therefore, when the number of physical block pairs is less than R, some physical block pairs are decomposed such that at least one physical block is included in R virtual blocks.

For a chip with a large number of good physical blocks, some variations can be made in order to supplement the blocks corresponding to the chip with a small number of good physical blocks. Therefore, decomposition is performed such that the single block is included in at least one chip and is used as both the physical block pair and the single block.

In the above-mentioned virtual block construction process, the number of physical blocks included in all of the virtual blocks is fixed to 16. However, similarly to the first embodiment, the number of physical blocks is not limited to a fixed value of 16, but it may be changed in the range of 14 to 16 to configure the virtual block. That is, all of the virtual blocks are configured such that each virtual block is configured with J to K physical blocks (J<K) and the number of accesses to all chips is equal to or less than N.

In this case, the following method is considered: the above-mentioned method is repeatedly applied to calculate the number of virtual blocks obtained from 16 physical blocks, the number of virtual blocks obtained from 15 physical blocks, and the number of virtual blocks obtained from 14 physical blocks and the number of physical blocks capable of configuring the largest number of virtual blocks is used. In addition, in Step S11 or Step S14 of FIG. 10, the following method may be used. When the insufficient number of physical blocks is counted, as the number of physical blocks which are initially insufficient, the physical blocks are acquired based on K which is the upper limit. However, when the number of acquired physical blocks is less than J, which is the lower limit, it is considered that the physical block is not short and the process ends.

Figure 25:
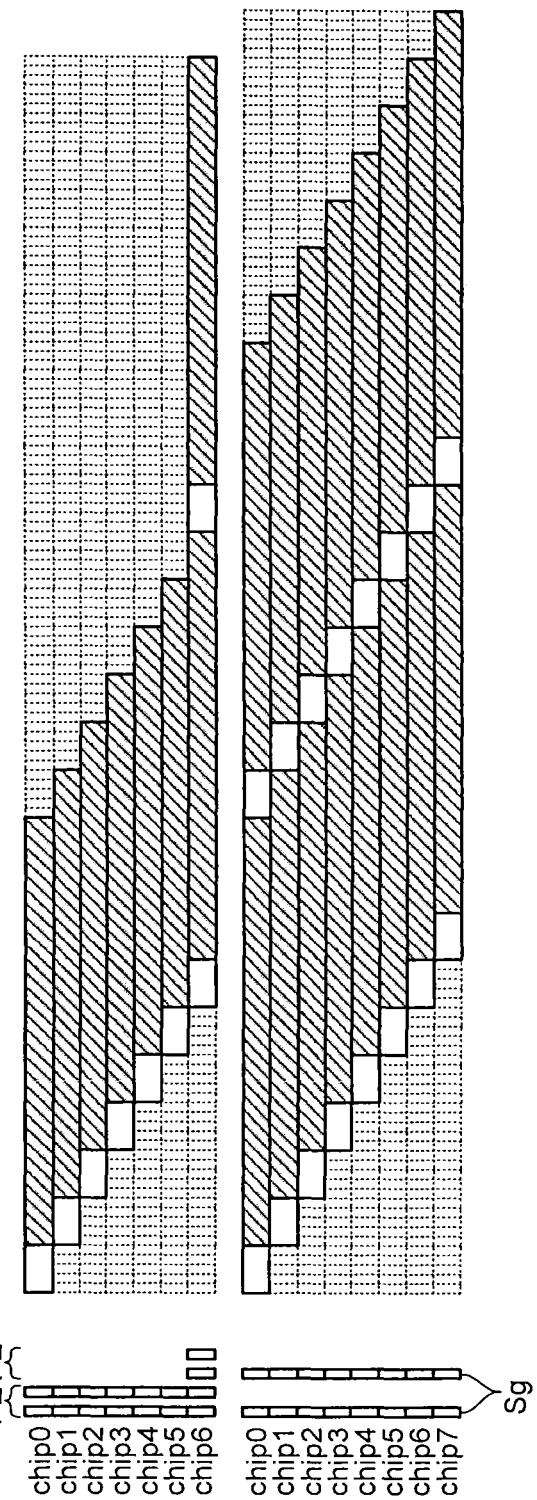
FIG. 25 is a timing chart when the virtual block constructed in this embodiment is written.

In the memory system, when each virtual block is configured with a set of the physical blocks which are processed by two accesses to each chip, it is expected that the process will end within a predetermined processing time for any accessed virtual block. The virtual block configured with a set of the physical blocks which are processed by two accesses may have various configurations. In this case, there is no large difference in the processing time between the configurations. For example, of two examples illustrated in FIG. 25, in the upper example, two physical block pairs are acquired from chip 6 and one physical block pair is acquired from each of chip 0 to chip 5. In the lower example, it is difficult to obtain all physical block pairs and the virtual block is configured with 16 single physical blocks. In the lower example, the number of programs is substantially two times that in the upper example, but the total program time is substantially equal to that in the upper example.

Third Embodiment

The above-described embodiment makes as many virtual blocks, each configured with M physical blocks or J to K physical blocks, as possible in the range equal to or less than the maximum value B, so as to satisfy the virtual block configuration conditions (first conditions) that the number of accesses to each chip is less than or equal to N. In a third embodiment, it is the first priority to make as many virtual blocks as possible in the range equal to or less than the maximum value B. Therefore, at least one of virtual block configuration conditions (first condition) and a second condition for determining the number of physical blocks included in the virtual block is relaxed.

For example, in a first method, the second condition is relaxed. The first method allows the number of physical blocks included in the virtual block to be less than a defined value M while maintaining the virtual block configuration conditions (first conditions) that the number of accesses to each chip is less than or equal to N, thereby making as many virtual blocks as possible in the range equal to or less than the maximum value B.

In a second method, the first condition is relaxed. The second method makes as many virtual blocks each having M physical blocks as possible in the range equal to or less than the maximum value B, while allowing the number of accesses to each chip to be more than N. In the second method, N for determining the virtual block configuration conditions is variable.

In a third method, the first and second conditions are relaxed. The third method makes as many virtual blocks as possible in the range equal to or less than the maximum value B while allowing the number of accesses to each chip to be more than N and allowing the number of physical blocks in the virtual block to be less than a defined value M. In the third method, N for determining the virtual block configuration conditions N and the number of physical blocks M included in the virtual block are variable.

According to the methods of the third embodiment, the maximum number of accesses N to the same memory chip or the capacity of each virtual block is reduced, but it is guaranteed to acquire a predetermined number of virtual blocks. Therefore, a writing algorithm is simplified.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a non-volatile semiconductor memory including a plurality of memory chips which can be operated in parallel and each of memory chips is divided into a plurality of planes capable of operating in parallel, each of the planes including a plurality of physical blocks as a unit of data erasing; and
a controller configured to control the non-volatile semiconductor memory,
wherein the controller includes:
a virtual block management unit configured to manage a correspondence between a virtual block and a plurality of physical blocks for configuring the virtual block; and
a virtual block construction unit configured to construct the virtual block according to configuration conditions such that the sum of the number of physical block pairs and the number of single blocks allocated from the same memory chip to one virtual block is less than or equal to a first value, the physical block pair being configured with the physical blocks which are selected from each of the planes in the same chip and can be accessed at the same time, and the single block being a physical block which does not configure the physical block pair.

2. The memory system according to claim 1, wherein the virtual block construction unit includes:
a first control unit configured to calculate the maximum number of virtual blocks which can be configured based on the number of good physical blocks included in the non-volatile semiconductor memory and a second value which is the number of physical blocks included in one virtual block;
a second control unit configured to divide the physical block pair into the single blocks in a manner that the number of elements, which is the sum of the number of physical block pairs and the number of single blocks, is equal to or greater than the maximum number of virtual blocks in each memory chip;
a third control unit configured to select the physical block pair or the single block from each memory chip;
a fourth control unit configured to register the block selected by the third control unit as the virtual block when the selected block reaches the second value; and
a fifth control unit configured to, when the block selected by the third control unit does not reach the second value, perform a process of maintaining the configuration conditions and adding the physical block pair or the single block to each memory chip until the block selected by the third control unit reaches the second value, and configured to register the block selected by the third control unit and the added physical block pair or single block as the virtual block, wherein
the operations of the second to fifth control units are repeatedly performed while the maximum number of virtual blocks is sequentially reduced.

3. The memory system according to claim 2, wherein the second control unit configured to further perform a process of removing the physical block pair or the single block from each memory chip in a manner that the sum of the number of physical block pairs and the number of single blocks in the memory chip is equal to or less than the product of the maximum number of virtual blocks and the first value.

4. The memory system according to claim 2, wherein the fifth control unit configured to further perform a process of dividing the physical block pair into the single blocks and adding the divided single blocks.

5. The memory system according to claim 3, wherein the fifth control unit configured to further perform a process of dividing the physical block pair into the single blocks and adding the divided single blocks.

6. The memory system according to claim 2, wherein the maximum number of virtual blocks is calculated by dividing the number of good physical blocks by the second value.

7. The memory system according to claim 2, wherein the number of physical blocks included in the virtual block is a fixed value.

8. The memory system according to claim 2, wherein the number of physical blocks included in the virtual block is variable between a lower limit and an upper limit.

9. The memory system according to claim 2, wherein the first value is variable.

10. The memory system according to claim 1, wherein the virtual block includes at least one block pair.

11. A method of constructing a virtual block in a non-volatile semiconductor memory including a plurality of memory chips which can be operated in parallel and each of memory chips is divided into a plurality of planes capable of operating in parallel, each plane including a plurality of physical block as a unit of data erasing, according to configuration conditions that, when a plurality of physical blocks included in the virtual block are selected, the sum of the number of physical block pairs and the number of single blocks allocated from the same memory chip to one virtual block is less than or equal to a first value, the physical block pair being configured with the physical blocks which can be accessed at the same time in the same memory chip and the single block being a physical block which does not configure the physical block pair, the method comprising:
a first step of calculating the maximum number of virtual blocks which can be configured based on the number of good physical blocks included in the non-volatile semiconductor memory and a second value which is the number of physical blocks included in one virtual block;
a second step of dividing the physical block pair into the single blocks in a manner that the number of elements, which is the sum of the number of physical block pairs and the number of single blocks, is equal to or greater than the maximum number of virtual blocks in each memory chip;
a third step of selecting the physical block pair or the single block from each memory chip;
a fourth step of registering the block selected in the third step as the virtual block when the selected block reaches the second value; and
a fifth step of, when the block selected in the third step does not reach the second value, performing a process of maintaining the configuration conditions and adding the physical block pair or the single block to each memory chip until the block selected in the third step reaches the second value, and registering the block selected in the third step and the added physical block pair or single block as the virtual block,
wherein the second to fifth steps are repeatedly performed while the maximum number of virtual blocks is reduced one by one.

12. The method of constructing the virtual block according to claim 11,
wherein, in the second step, the physical block pair or the single block is removed from each memory chip in a manner that the sum of the number of physical block pairs and the number of single blocks in the memory chip is equal to or less than the product of the maximum number of virtual blocks and the first value.

13. The method of constructing the virtual block according to claim 11,
wherein the fifth step includes dividing the physical block pair into the single blocks and adding the divided single blocks.

14. The method of constructing the virtual block according to claim 12,
wherein the fifth step includes dividing the physical block pair into the single blocks and adding the divided single blocks.

15. The method of constructing the virtual block according to claim 11,
wherein the maximum number of virtual blocks is calculated by dividing the number of good physical blocks by the second value.

16. The method of constructing the virtual block according to claim 11,
wherein the number of physical blocks included in the virtual block is a fixed value.

17. The method of constructing the virtual block according to claim 11, wherein the number of physical blocks included in the virtual block is variable between a lower limit and an upper limit.

18. The method of constructing the virtual block according to claim 11, wherein the first value is variable.

19. The method of constructing the virtual block according to claim 11, wherein the virtual block includes at least one block pair.

* * * * *